US010746587B1

(12) United States Patent
Nichols (10) Patent No.: US 10,746,587 B1
(45) Date of Patent: Aug. 18, 2020

(54) SYSTEM AND METHOD FOR DETERMINING A REEL WEIGHT ON A REEL-CARRYING UNIT (71) Applicant: Altec Industries, Inc., Birmingham, AL (US)

(72) Inventor: Robert Nichols, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/871,263

(22) Filed: May 11, 2020

(51) Int. Cl.
*G01G 19/10* (2006.01)
*G01G 19/12* (2006.01)
*B60P 3/035* (2006.01)
*B65H 49/24* (2006.01)
*B65H 63/08* (2006.01)
*G01G 11/00* (2006.01)
*G01G 19/52* (2006.01)
*G01G 11/04* (2006.01)

(52) U.S. Cl.
CPC .............. *G01G 19/12* (2013.01); *B60P 3/035* (2013.01); *B65H 49/24* (2013.01); *B65H 63/084* (2013.01); *G01G 11/04* (2013.01); *G01G 19/10* (2013.01); *G01G 19/52* (2013.01); *B65H 2701/34* (2013.01)

(58) Field of Classification Search
CPC ........ G01G 11/04; G01G 19/10; G01G 19/12; G01G 19/52; B65H 49/24; B65H 63/084; B65H 2701/34; B60P 3/035
USPC .................................................. 177/136–141
See application file for complete search history.

(56) References Cited

U.S. PATENT DOCUMENTS

| 2,958,478 | A |   | 11/1960 | Petersen et al. |   |
|---|---|---|---|---|---|
| 3,857,452 | A | * | 12/1974 | Hartman | G01G 3/1404 177/139 |
| 3,902,612 | A | * | 9/1975 | Hall | B60P 3/035 414/486 |
| 4,137,977 | A | * | 2/1979 | Alger | G01G 19/00 177/146 |
| 4,155,518 | A | * | 5/1979 | Small | B60P 3/035 242/388.7 |
| 4,338,059 | A | * | 7/1982 | Anderson | B60P 3/035 414/501 |
| 4,691,792 | A | * | 9/1987 | Shintani | G01G 5/045 177/1 |
| 5,161,628 | A | * | 11/1992 | Wirth | G01G 19/08 177/137 |
| 5,824,965 | A | * | 10/1998 | Fujii | G01G 19/12 177/136 |
| 5,837,945 | A | * | 11/1998 | Cornwell | B65F 3/04 177/136 |

(Continued)

*Primary Examiner* — Randy W Gibson
(74) *Attorney, Agent, or Firm* — Erise IP, P.A.

(57) ABSTRACT

A reel weight measurement system is shown and described herein. In some embodiments, the reel weight measurement system comprises strategically placed position and load sensors for measuring an orientation of a reel-carrying unit and measuring loads in the reel-carrying unit. The loads may be indicative of forces due to the weight of the reel when the reel is supported by a carriage of the reel-carrying unit. The weight of the reel may be determined by summing the forces and moments in the system while the carriage is in motion or static. Further, the weight of the reel may be determined by comparing the force measurements and orientation of the carriage to stored calibration data.

20 Claims, 8 Drawing Sheets

(56) References Cited

U.S. PATENT DOCUMENTS

| | | | | |
|---|---|---|---|---|
| 6,384,349 B1 * | 5/2002 | Voll | ............. | G01G 19/10 |
| | | | | 177/137 |
| 8,021,097 B2 * | 9/2011 | McVaugh | ............. | B60P 3/035 |
| | | | | 242/557 |
| 8,359,143 B2 * | 1/2013 | Colwell | ............. | E02F 3/46 |
| | | | | 701/50 |
| 8,825,315 B2 * | 9/2014 | Colwell | ............. | E02F 3/46 |
| | | | | 701/50 |
| 9,091,586 B2 * | 7/2015 | Hague | ............. | G01G 19/10 |
| 10,017,095 B2 * | 7/2018 | Keast | ............. | B60P 3/035 |

* cited by examiner

SYSTEM AND METHOD FOR DETERMINING A REEL WEIGHT ON A REEL-CARRYING UNIT

BACKGROUND

1. Field

Embodiments of the invention relate to a weight measurement system. Specifically, embodiments of the invention relate to determining the weight of a reel on a reel-carrying unit.

2. Related Art

Utility workers utilize reel-carrying units to exchange and transport reel cables. The reel cables are wound on reels that are loaded onto the reel-carrying units for transportation. Typically, a pair of reel-carrying units are transported to a job site; one carrying a new cable and one carrying an empty reel. Cable is extracted from the ground or from utility poles and wound around the empty reel. The new cable is then placed in the ground or on the utility poles to replace the extracted cable. Typically, there is no way of knowing the weight of the extracted cable that is placed on the reel-carrying unit. The reel-carrying unit has maximum load limits for hydraulics and axels. Consequently, the reel-carrying unit may be damaged if the cable and reel exceed the load limits of the reel-carrying unit. Further, the Department of Transportation (DOT), both nation-wide and state-wide, has regulations on vehicle weights for roadways and bridges. Without knowing the weight of the extracted cable and reel, there is no way of knowing if the reel-carrying unit is exceeding these limits.

What is needed is a system and method for determining the weight of the reel and extracted cable. Using a system of sensors, the orientation of the reel-carrying unit and the forces acting on the system by the weight of the reel may be measured. The weight of the reel may be determined from the sensor measurements. The weight of the reel may be determined either statically or dynamically. A user may be notified of the reel weight and may be alerted if the reel weight and the weight of the reel-carrying unit exceed reel-carrying unit specifications and DOT specifications. The weight of the reel, along with the weights of other reels, may be tracked and reported for fleet management. This may allow a company to determine the amount of scrapped cable and understand reel carrying needs.

SUMMARY

Embodiments of the invention solve the above-mentioned problems by providing a system that determines a weight of a reel on a reel-carrying unit. A first embodiment of the invention is directed to a reel weight measurement system for a reel-carrying unit comprising a chassis, a carriage supported by the chassis, the carriage comprising a lifting arm supporting the reel, a cylinder configured to rotate the lifting arm about a main pin, at least one first sensor disposed on the carriage and configured to measure at least one angle, wherein the at least one angle is indicative of the orientation of the carriage, at least one second sensor disposed on the carriage and configured to measure at least one force on the carriage, wherein the at least one force is indicative of the weight of the reel, one or more non-transitory computer-readable media storing computer-executable instructions that, when executed by at least one processor, perform a method of determining the weight of the reel, the method comprising the steps of receiving at least one first signal indicative of the at least one angle from the at least one first sensor, receiving at least one second signal indicative of the weight of the reel from the at least one second sensor, and determining the weight of the reel based at least in part on the at least one first signal and the at least one second signal.

A second embodiment of the invention is directed to one or more non-transitory computer-readable media storing computer-executable instructions that, when executed by at least one processor, perform a method of determining a weight of a reel, the method comprising the steps of receiving at least one first signal from at least one first sensor, wherein the at least one first signal is indicative of an orientation of a carriage, receiving at least one second signal from at least one second sensor, wherein the at least one second signal is indicative of a force applied to the carriage by the weight of the reel, wherein the reel is supported by the carriage, and determining the weight of the reel based on the orientation of the carriage and the force applied by the weight of the reel.

A third embodiment of the invention is directed to a reel weight measurement system for a reel-carrying unit comprising a chassis, a carriage supported by the chassis, the carriage comprising a lifting arm supporting the reel, a cylinder configured to rotate the lifting arm supporting the reel about a main pin, at least one first sensor disposed on the carriage and configured to measure at least one angle, wherein the at least one angle is indicative of an orientation of the carriage, at least one second sensor disposed on the carriage and configured to measure at least one force on the carriage, wherein the at least one force is indicative of the weight of the reel, one or more non-transitory computer-readable media storing computer-executable instructions that, when executed by at least one processor, perform a method of determining the weight of the reel, the method comprising the steps of receiving, from the at least one first sensor, at least one first signal indicative of the at least one angle of the carriage supporting the reel, receiving, from the at least one second sensor, at least one second signal indicative of a pressure in the cylinder, determining, from the at least one first sensor, the orientation of the carriage, determining, from the at least one second sensor, the pressure in the cylinder, determining the weight of the reel by comparing the orientation of the carriage and the pressure in the cylinder with stored data, wherein the stored data is indicative of a relationship between the orientation of the carriage, the cylinder pressure, and the weight of the reel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, a system of sensors connected to at least one processor and one or more non-transitory computer-readable media storing computer-executable instructions that, when executed by the at least one processor, perform a method of determining a weight of a reel on a reel-carrying unit. The sensors may be placed at various locations on the reel-carrying unit for detecting orientation (component angles) and forces. The sensor measurements may be used to calculate a weight of the reel. In some embodiments, the sensor measurements may be compared to calibration data to determine the weight of the reel.

Figure 1:
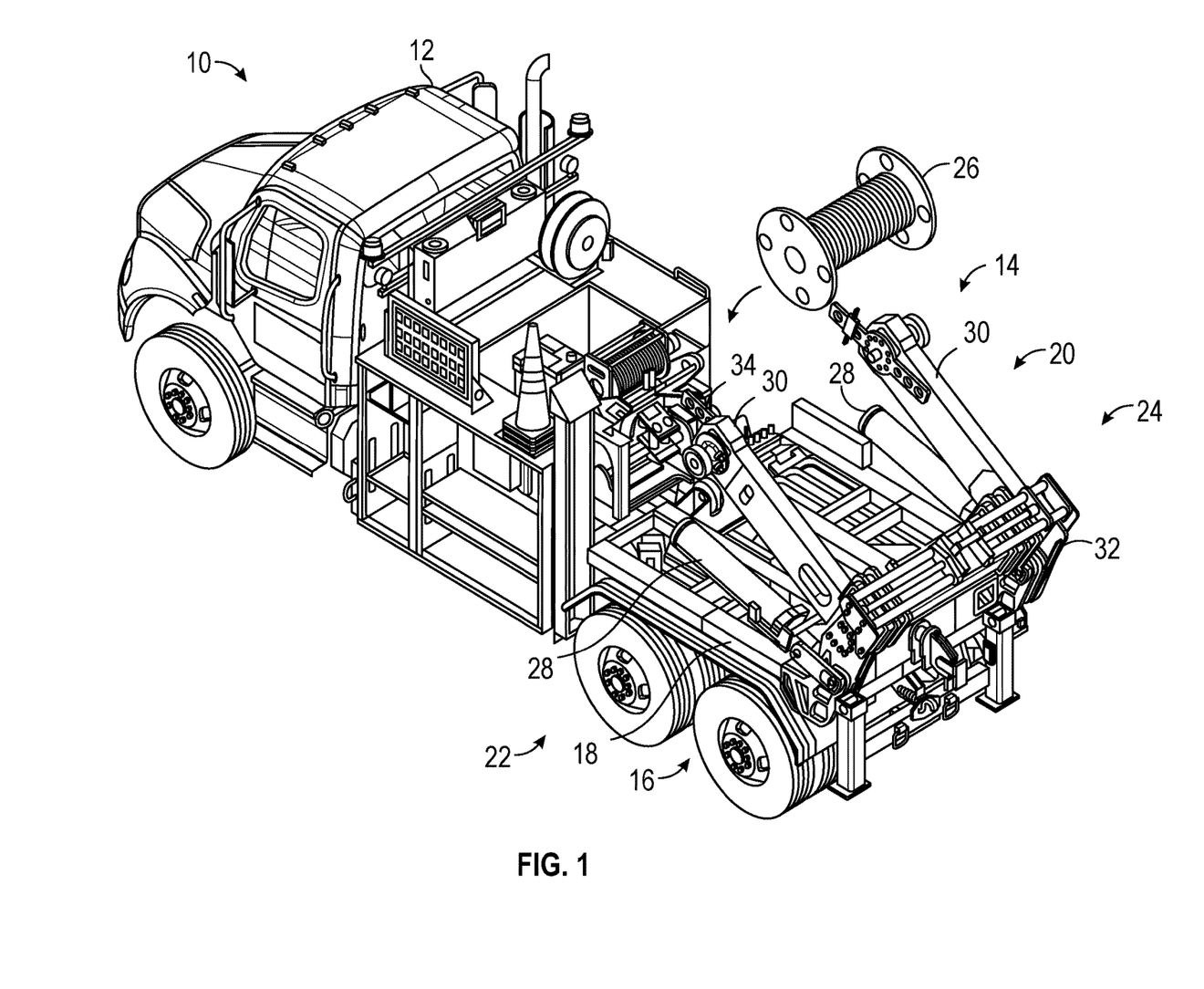
FIG. 1 depicts a perspective view of a utility vehicle with a reel-carrying unit.

FIG. 1 presents an exemplary vehicle 10 which, in some embodiments, may be a utility vehicle 12. The vehicle 10 may also comprise, or be attached to, a reel-carrying unit 14. However, the vehicle 10 may be the utility vehicle 12, or, in some embodiments, may be any vehicle that is capable of attaching to the reel-carrying unit 14. For example, the vehicle 10 may be a car or truck and may either be manned or unmanned such that the vehicle 10 may be remotely controlled or autonomous. In some embodiments, the vehicle 10 may be a boat for transporting reels on water. In some embodiments, the vehicle 10 and the reel-carrying unit 14 are the same device and permanently connected.

Figure 2:
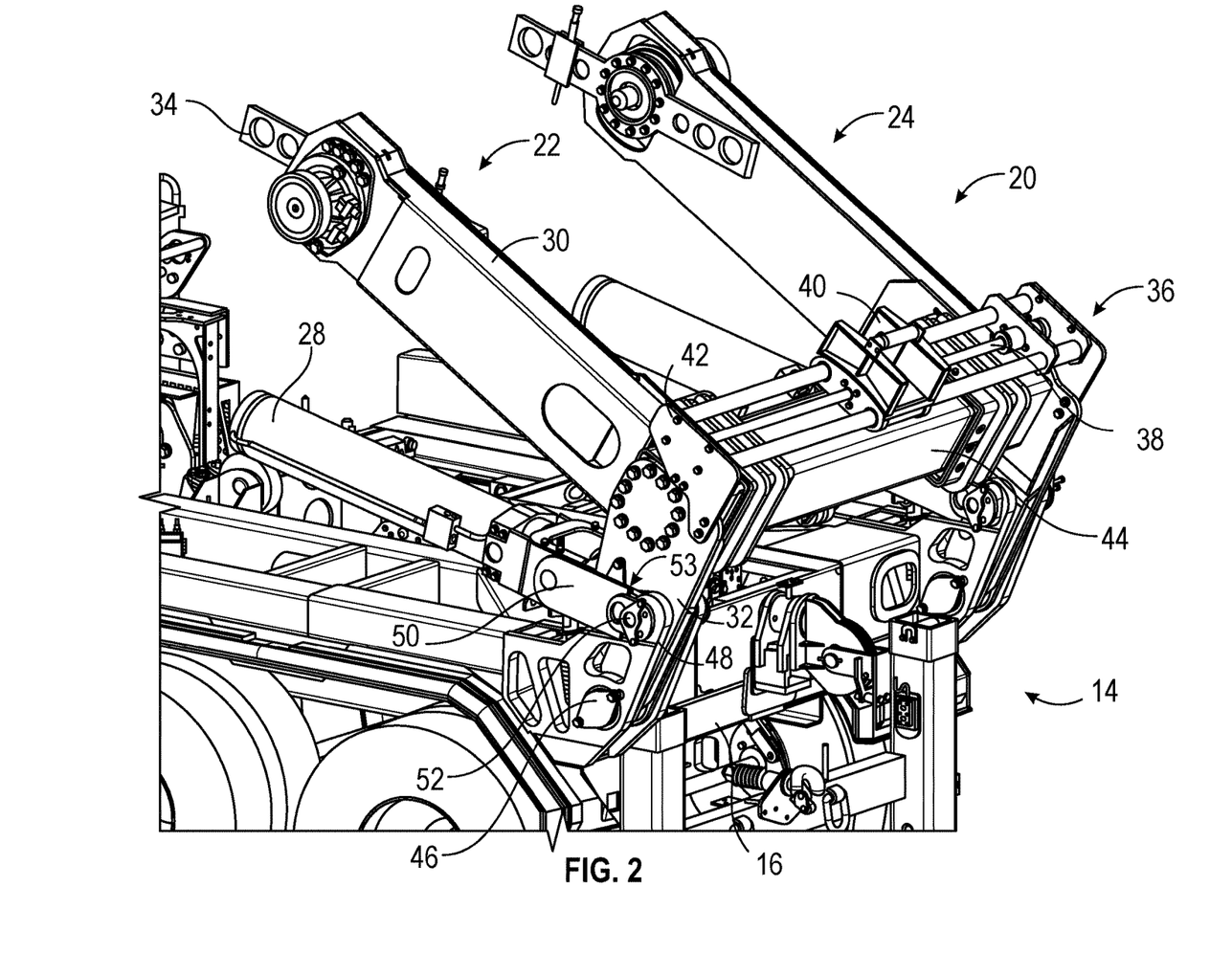
FIG. 2 depicts a close-up view of an embodiment of the reel-carrying unit.

The reel-carrying unit 14 may comprise a chassis 16, a bed 18, and a carriage 20. For simplicity, the carriage 20 may be described in relation to one side. As shown in FIGS. 1 and 2, the carriage 20 comprises a left side 22 and a right side 24. In some embodiments, the left side 22 and the right side 24 may be mirror images of one another. For simplicity, the components of the carriage 20 will be discussed in relation to one side. However, it should be understood that two sides exist and may work together to lift a reel 26. For example, when a trunnion cylinder 28 on the left side 22 is referenced, it should be understood that at least a second trunnion cylinder is present on the right side 24 of the carriage 20 performing the same or similar action to lift the reel 26 as shown in the FIGS. 1-4A. As such, the trunnion cylinder 28 may reference the left side 22, the right side 24, or both sides. Similar reference may be made to a lifting arm 30, a lifting arm support 32, a reel attachment 34, and similar components and sub-components described in relation to FIGS. 3 and 4A.

In some embodiments, the reel-carrying unit 14 attaches to the vehicle 10 at a hitch, fifth-wheel, or any other attachment mechanism (not shown). The reel-carrying unit 14 may be operated at the vehicle 10 by a user input system. For example, the reel-carrying unit 14 may electrically, hydraulically, and pneumatically connect to the vehicle 10. The reel-carrying unit 14 electrical, hydraulic, and/or pneumatic systems may be controlled at the vehicle 10. For example, the user may drive the vehicle 10 to a construction site to pick up the reel 26. The user may access a user input to control an electric motor that controls the hydraulic system of the reel-carrying unit 14 to lower the lifting arm 30. The user may attach the reel 26 to the lifting arm 30 at the reel attachment 34, and again access the user input to control the lifting arm 30 to lift the reel 26. The user may then drive the vehicle 10 to transport the reel 26. The user input may be disposed at the vehicle 10 and disposed at the reel-carrying unit 14 to allow the user to control the reel-carrying unit 14 from any location. In some embodiments, the reel-carrying unit 14 may comprise a self-contained power source such as a battery or engine. The reel-carrying unit 14 may be self-propelled and may be detached from the vehicle 10. When the reel-carrying unit 14 is detached from the vehicle 10, the reel-carrying unit 14 may be controlled remotely by an operator with a mobile device. In some embodiments, the control of the reel-carrying unit 14 may also be autonomous.

In some embodiments, the reel-carrying unit 14 comprises the chassis 16 for transport of the reel-carrying unit 14. The chassis 16, in some embodiments, comprises at least two wheels and an axel connecting the wheels and allowing rotation. In some embodiments, the axels have a maximum allowable weight for transport. In some embodiments, the current weight measurement system described herein is designed to compare the weight of the reel 26 to the requirements of the chassis 16. Further, DOT roadway and bridge specifications may be compared to the weight of the reel 26 to determine if the vehicle 10 is roadworthy when loaded.

In some embodiments, the reel-carrying unit 14 may comprise a bed 18. The bed 18 may be attached to the chassis 16 and provide attachment points for supporting the carriage 20. The bed 18 may further be in contact with the lifting arm 30 and the reel 26 when the reel-carrying unit 14 is in a fully retracted or stowed configuration. The fully retracted configuration may be used during transport. The fully retracted configuration is discussed in more detail below. In some embodiments, the bed 18 is part of the chassis 16.

In some embodiments, the reel-carrying unit 14 further comprises the carriage 20. The carriage 20 comprises the trunnion cylinder 28, the lifting arm 30, lifting-arm support 32, and the reel attachment 34 as well as other components connecting components discussed below. The carriage 20 may attach to, lift, and support the reel 26. The carriage 20 components may be operable by electronics, hydraulics, and pneumatics. The carriage 20 may be operated autonomously and by a user either directly using an input at the vehicle 10 and the reel-carrying unit 14, or remotely using wired or wireless communication.

FIG. 2 depicts a close-up view of the reel-carrying unit 14 from a perspective view. In some embodiments, the carriage 20 further comprises a crossmember assembly 36 comprising adjustment rods 38 connected to a motor (not shown) for rotating the adjustment rods 38. The adjustment bracket 42 may be connected to the lifting arm support 32 and the adjustment rods 38. The motor, adjustment rods 38, and cable guide 40 may work together with the adjustment rods 38 rotating and the cable guide moving laterally to guide the cable while winding.

In some embodiments, lateral movement of the left side 22 and the right side 24 may be controlled by hydraulics, pneumatics, and/or electronics for operation as described herein. In some embodiments, a width of the carriage 20 may be adjusted. The width of the carriage 20 may be the distance between the left side 22 and the right side 24. The lateral cylinder may extend and contract causing the adjustment bracket 42 to move the lifting arm 30 of the left side 22 and corresponding components of the right side 24. The lifting arm 30 may slide along the crossmember 44 allowing the reel attachment 34 to be aligned and attached to the reel 26.

In some embodiments, the carriage 20 may rotate relative to the chassis 16 to align with, attach, and move, the reel 26. A main pin 46 may be a main attachment point, and support, between the carriage 20 and the chassis 16. The lifting-arm support 32 may be connected to the chassis 16 via the main pin 46 and support bracket 48. The lifting arm 30 and the crossmember assembly 36, as well as all components associated with the lifting arm 30 and the crossmember assembly 36, may be supported by the lifting arm support 32. Further, the trunnion cylinder 28 may be attached to a cylinder brace 50 which may be attached to the support bracket 48 at a cylinder brace pin 52 also shown at point D in FIG. 4A. Further, a cylinder pin 53 may connect the cylinder to the lifting-arm support 32 at point B shown in FIG. 4A. The carriage 20 may rotate about the main pin 46 when force is applied via the trunnion cylinder 28 through the cylinder brace 50 and the cylinder brace pin 52.

The trunnion cylinder 28 may be attached to the lifting-arm support 32 by the cylinder pin 53 and to the support bracket 48 via the cylinder brace pin 52. The cylinder pin 53 may transfer the force created by the trunnion cylinder 28 to the lifting-arm support 32 resulting in rotation of the carriage 20. The cylinder pin 53 may also allow relative rotation between the lifting-arm support 32 and the trunnion cylinder 28.

Figure 3:
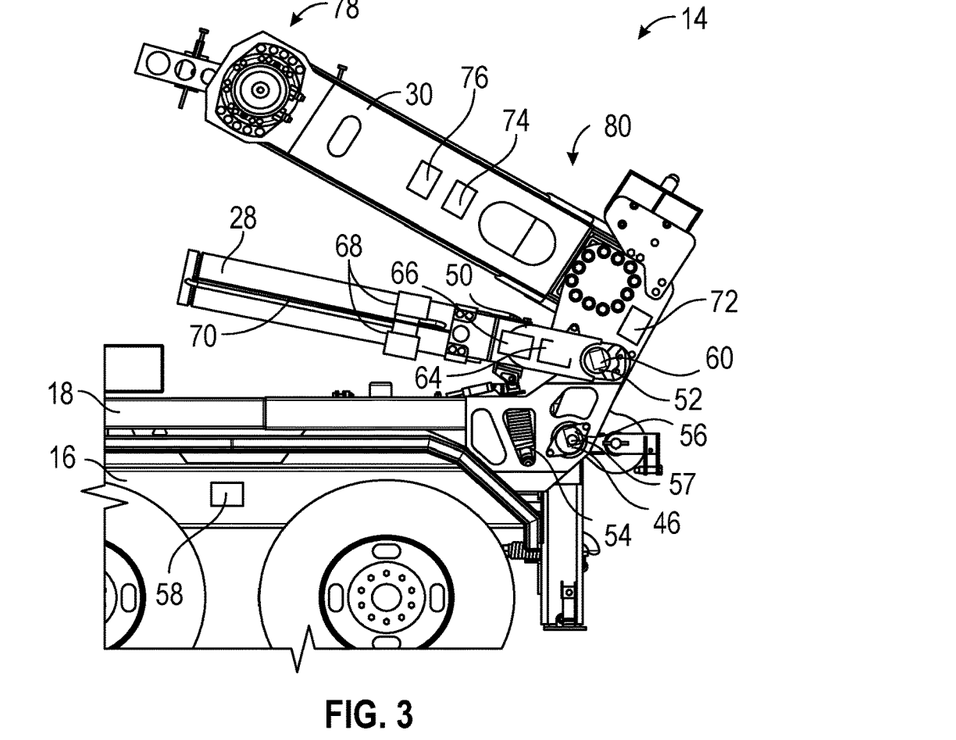
FIG. 3 depicts an embodiment of the reel-carrying unit with possible sensors locations indicated.
Figure 4A:
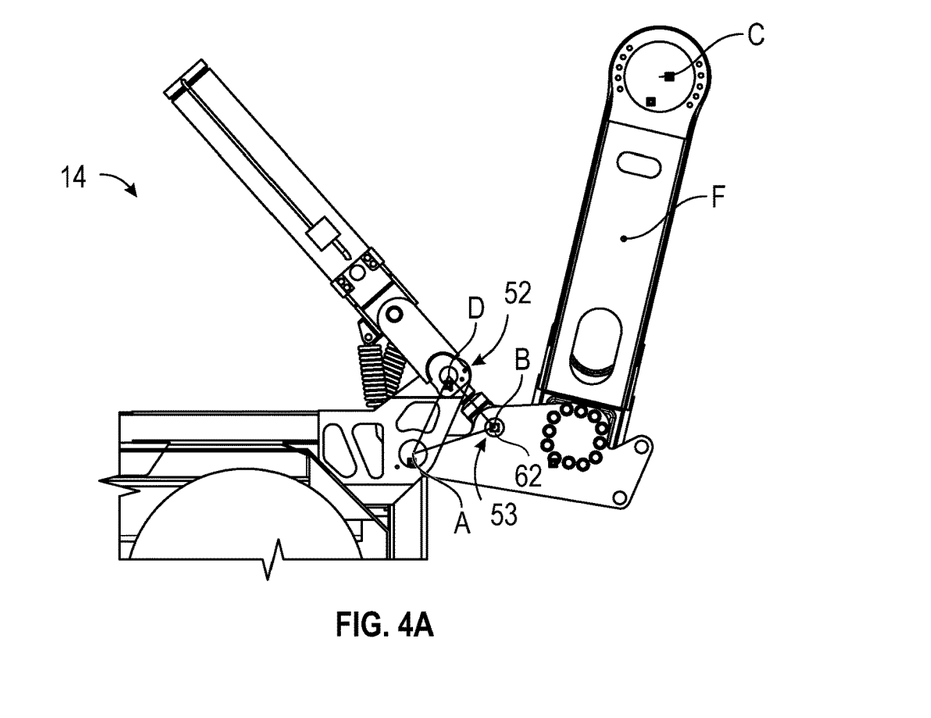
FIG. 4A depicts the reel-carrying unit of FIG. 3 in a more extended configuration.

FIGS. 3 and 4A depict two configurations of the reel-carrying unit. It should be understood that FIGS. 3 and 4A depict the left side 22 of the carriage 20. The right side 24 of the carriage 20 may be a mirror image of the left side 22 and may comprise all components discussed in relation to the left side 22. Any components and sensors may have similar pairs on the right side 24 as described above.

Further, sensors, discussed herein and depicted in FIG. 3, may be on the left side 22, the right side 24, or both sides of the reel-carrying unit 14. For example, a main pin rotary encoder 56 measuring rotation of the carriage 20 may be on the left side 22 or the right side 24. Similarly, there may be pressure transducers 68 on both the left side 22 and the right side 24 measuring the rod pressure in trunnion cylinders on the left side 22 and the right side 24. Any sensors described herein may be on either or both sides. Any combination and number of sensors may be attached to any components of the reel-carrying unit 14 and used to determine the orientation of the reel-carrying unit 14 and the weight of the reel 26.

FIG. 3 depicts the carriage 20 in a mostly retracted position. In some embodiments, the carriage 20 may retract such that the trunnion cylinder 28 and the lifting arm 30 rest on the bed 18 and the chassis 16. FIG. 4A depicts the carriage 20 in a more extended configuration than depicted in FIG. 3.

In some embodiments, the carriage 20 is attached to the chassis 16 at the main pin 46. The main pin 46 may allow rotation of the carriage 20 about the main pin 46. The rotation may be provided by force applied by the trunnion cylinder 28. The trunnion cylinder 28 may be a hydraulic cylinder that extends when hydraulic fluid is pumped into the trunnion cylinder 28. The trunnion cylinder 28 may press against the lifting-arm support 32 at the cylinder pin 53 through pinning point B depicted in FIG. 4A. An opposing force may be applied at cylinder brace pin 52 at pinning point D depicted in FIG. 4A. As the trunnion cylinder 28 extends, the lifting-arm support 32 may rotate about the main pin 46 at carriage pinning point A. The carriage 20 may be extended until the reel attachments 34 at reel center of mass point C are aligned with the reel 26. The trunnion cylinder 28 may then be retracted, rotating the carriage 20, and lifting the reel 26.

The trunnion cylinder 28 may further be attached to the chassis 16 by a support cylinder 54. The trunnion cylinder 28 may be attached to the lifting-arm support 32 at the cylinder pin 53. As a result, the trunnion cylinder 28 may rotate as it extends. The support cylinder 54 may extend when the trunnion cylinder 28 extends allowing the trunnion cylinder 28 to both rotate the lifting arm support 32 and rotate about the cylinder pin 53.

The reel 26 may be connected to the carriage 20 at the reel attachment 34, and lifted by actuating the trunnion cylinder 28. The left side 22 and the right side 24 may be extended and retracted laterally by cylinders (not shown). Consequently, the lifting arm 30, attached to the crossmember 44, is also moved laterally relative to the reel-carrying unit 14. The lateral movement allows the reel attachment 34 to be clamped onto the reel 26 and attached to the reel 26. Next, the trunnion cylinder 28 is actuated to retract the carriage 20 and the reel 26. The carriage 20, again, rotates about the main pin 46 at carriage pinning point A. The carriage 20 may rotate until the carriage 20 and the reel 26 are secured on the reel-carrying unit 14. The weight of the reel 26 may be determined at any point while the reel 26 is supported by the reel-carrying unit 14.

Further, FIG. 3 depicts exemplary sensor locations on the reel-carrying unit 14. In some embodiments, the orientation of the carriage 20 as well as forces and moments caused by the weight of the reel 26 are measured to determine the weight of the reel 26. Strategically placed location and load sensors may be used to determine the orientation of the carriage 20 and the forces in the carriage 20. The orientation and the forces may be used to determine the weight of the reel 26.

In some embodiments, a main pin rotary encoder 56 may be disposed at the main pin 46 at carriage pinning point A. The main pin rotary encoder 56 may measure a magnetic field associated with a magnet 57 of the main pin rotary encoder 56. The magnet 57 may rotate relative to a magnetic sensor of the main pin rotary encoder 56. The magnet 57 may be attached to the rotating carriage 20, the stationary chassis 16, the bed 18, the main pin 56, or any other component that rotates relative to the main pin rotary encoder 56 magnetic sensor. Either way, the main pin rotary encoder 56 sensor and magnet 57 rotate relative to one another indicative of the rotation of the carriage 20 relative to the chassis 16. Measurement of the change in magnetic field may be indicative of the rotation or the carriage 20 and may provide a measurement of the orientation of the carriage 20.

In some embodiments, a chassis inclinometer 58 may be disposed on the chassis 16 for measuring an angle of the chassis 16 relative to gravity. Inclinometers described herein may comprise or be any general level, bubble, liquid conducting, accelerometer based inclinometer, and any other sensor that may detect the acceleration of gravity. Any one of the various inclinometer sensors may measure an angle of the inclinometer, and attached component, based on the direction of the acceleration vector component of the force of gravity. This may be described as measuring an angle relative to gravity herein. Further, the measurements of any inclinometers may be compared to determine the relative angles between the corresponding components. The angle of the chassis 16 may provide a base level measurement for comparing angle measurements of the carriage 20. In some embodiments, the angle of the component of the carriage 20 relative to the chassis 16 may need to be known. If the angle of the components of the carriage 20 are known relative to gravity, the angle of the chassis 16 must also be known to determine the carriage 20 angles relative to the chassis 16. Measuring the angle of the chassis 16 and comparing component angles may be necessary if the reel-carrying unit 14 is not on level ground.

In some embodiments, a cylinder pin rotary encoder 60 may be disposed at the cylinder pin 53, the cylinder brace pin 52, or both. The trunnion cylinder 28 may be attached to the lifting-arm support 32 by the cylinder pin 53 at point B shown in FIG. 4A. The cylinder pin rotary encoder 60 may be utilized similarly to the main pin rotary encoder 56 as described above. The cylinder pin rotary encoder 60 may provide information indicative of the orientation of the carriage 20 by measuring the rotation of the carriage 20 relative to the trunnion cylinder 28 and the chassis 16.

In some embodiments, a load pin 62 may be placed on the cylinder pin 53 at point B as shown in FIG. 4A. The load pin 62 may also be placed at the cylinder brace pin 52 at point D as shown in FIG. 4A. The load pin 62 may detect the load through the cylinder pin 53 or cylinder brace pin 52. The load in the cylinder pin 53 and the cylinder brace pin 52, measured by the load pin 62, may be indicative of the pressure supplied by the trunnion cylinder 28. The pressure may be supplied by the trunnion cylinder 28 to hold the reel 26 in a static position or move the reel 26. Therefore, the pressure in the trunnion cylinder 28, and resulting force in the load pin 62, may be indicative of the weight of the reel 26.

In some embodiments, an axial load cell 64 may be disposed on the cylinder brace 50. The axial load cell 64 may measure the axial load through the cylinder brace 50. The measured axial load may be indicative of the weight of the reel 26 as described in reference to the load pin 62 described above.

In some embodiments, a cylinder brace inclinometer 66 may be disposed on the cylinder brace 50. The cylinder brace inclinometer 66 may measure an angle of the cylinder brace 50 relative to gravity. The angle of the cylinder brace 50 may rotate relative to the lifting-arm support 32 and the chassis 16. Consequently, the angle of the cylinder brace 50 is indicative of the orientation of the carriage 20 and the location of the reel 26.

In some embodiments, the pressure transducers 68 may be attached to the trunnion cylinder 28 for measuring pressure in the trunnion cylinder 28. The pressure transducers 68 may be in line with hydraulic fluid of the trunnion cylinder 28 to measure the pressure. In one embodiment, the pressure transducers 68 may measure the pressure in the trunnion cylinder 28 directly. The pressure in the trunnion cylinder 28 may be supplied to extend and retract the carriage 20 with and without the weight of the reel 26. Therefore, the pressure in the trunnion cylinder 28, measured by the pressure transducers 68, may be indicative of the weight of the reel 26. In some embodiments, the pressure transducers 68 may be a plurality of pressure transducers that may be associated with the trunnion cylinder 28. In some embodiments, pressure transducers 68 may be configured to detect bore pressure and rod pressure of the trunnion cylinder 28. In some embodiments, a single pressure transducer may be used.

In some embodiments, the linear distance of the trunnion cylinder 28 may be measured by a linear position sensor 70. The linear position sensor 70 may be disposed on the trunnion cylinder 28 and measure the extension of the trunnion cylinder 28. The extension of the trunnion cylinder 28 may be indicative of the rotation and orientation of the carriage 20. Therefore, the measurement by linear position sensor 70 may be used in combination with the load and pressure measurements to determine the weight of the reel 26 at various orientations.

In some embodiments, a lifting-arm support inclinometer 72 may be disposed on the lifting-arm support 32. The lifting-arm support inclinometer 72 may provide an angle of the lifting-arm support 32 relative to gravity. Because the lifting-arm support 32 is connected to the lifting arm 30, the orientation of the lifting-arm support 32 may be indicative of the orientation of the carriage 20. Therefore, the measurement from the lifting-arm support inclinometer 72 may be indicative of the orientation of the carriage 20 and may be used to calculate the weight of the reel 26.

In some embodiments, a lifting-arm inclinometer 74 may be disposed on the lifting arm 30. The lifting arm 30 may lift the reel 26 and may be moved by the trunnion cylinder 28. Therefore, the lifting-arm inclinometer 74 may be indicative of the orientation of the carriage 20. The measurement of the lifting-arm inclinometer 74 may be indicative of the orientation of the carriage 20 and may be used to determine the weight of the reel 26.

In some embodiments, a lifting-arm load cell 76 may be disposed on the lifting arm 30. The lifting-arm load cell 76 may detect force in the lifting arm 30. The force measured in the lifting arm 30 may be indicative of the weight of the reel 26 attached at a distal end 78 of the lifting arm 30. The lifting arm 30 may be attached to the lifting arm support 32 at a proximal end 80 providing support for the reel 26. The measurement from the lifting-arm load cell 76 may be combined with measurements from other sensors to determine the weight of the reel 26.

The angles and orientation measurements described above may be used in combination with the force measurements to determine the weight of the reel 26. As the orientation changes, the forces and moments in the carriage 20 change. If the orientation and the forces and moments are known, and if the acceleration of the carriage 20 is zero, the moments and forces can be summed to zero, and the weight of the reel 26 can be calculated. The weight of the reel 26 may also be determined while the carriage 20 is moving. A friction, or resistance, factor may be added to account for the effects of the movement of the carriage 20 on the measurements.

FIG. 4A depicts the carriage 20 in a more extended position than depicted in FIG. 3. As the trunnion cylinder 28 extends, the carriage 20 may transition from the configuration depicted in FIG. 3 to the configuration depicted in FIG. 4A. The carriage 20 may extend further to attach the reel 26 and retract fully such that the carriage 20 is resting on the bed 18 and the chassis 16. As the carriage 20 moves from extended to retracted with the reel 26, the angles may be measured using the position sensor comprising inclinometers and rotary encoders and the forces may be measured with the load sensors. Further, distance sensors may be used to measure relative distance changes between components on the carriage 20. The measurements, combined with a Free-Body Diagram (FBD) 400 shown in FIG. 4B, allows determination of the weight of the reel 26 at any orientation of the carriage 20 between fully extended and fully retracted. However, when the carriage 20 is in a position where no load is measured, the weight calculation may provide erroneous results. For example, when the reel 26 and carriage 20 weight is balanced, the trunnion cylinder 28 does very little to no work to maintain the orientation. Therefore, though the reel is supported, the pressure transducers may detect a value of little to no force exerted and, consequently, provide a measurement of zero. Therefore, as the orientation of the carriage 20 converges on these points, the weight measurement results may not be trusted. These results may be thrown out when determining the weight of the reel 26.

Figure 4B:
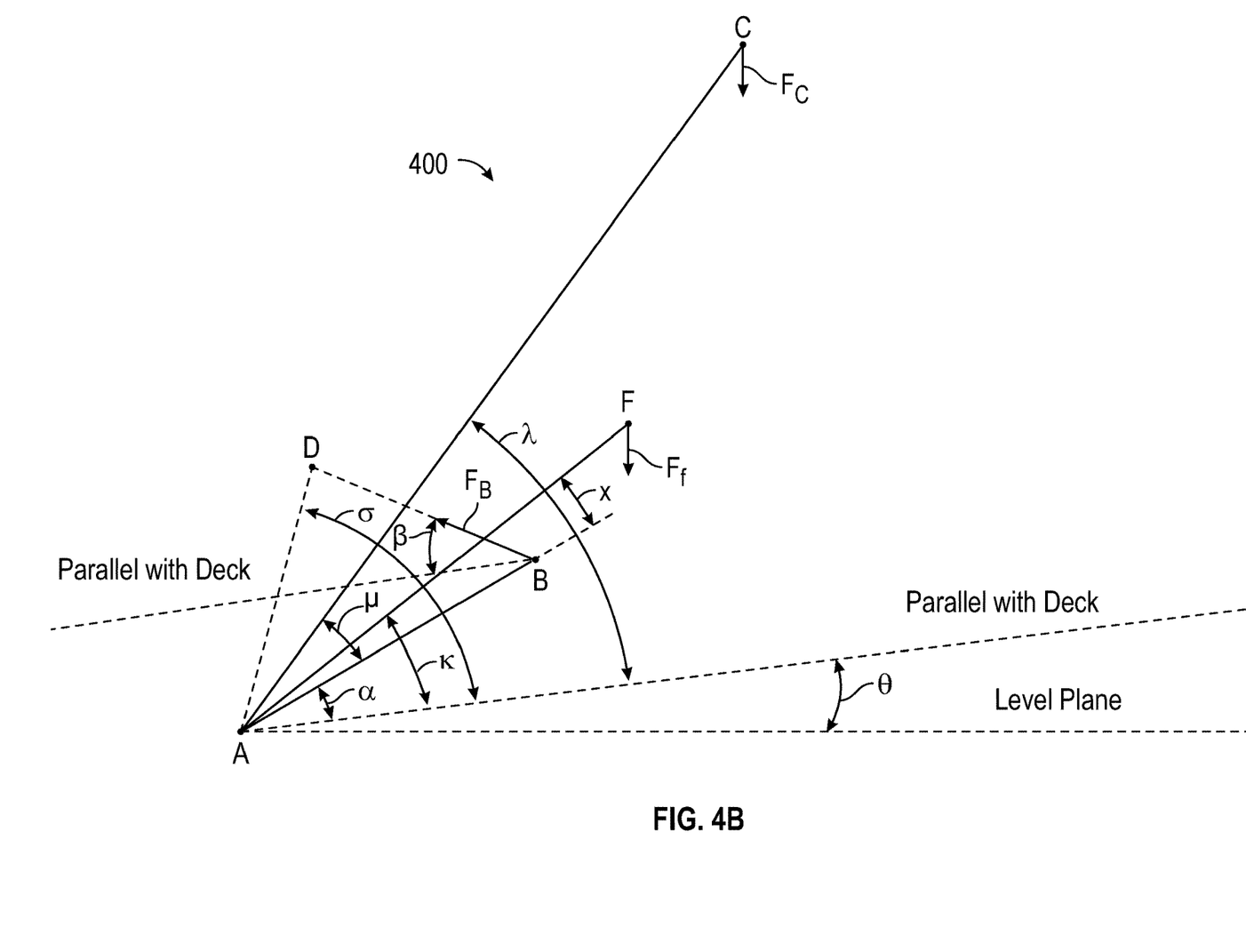
FIG. 4B depicts a free-body diagram of the configuration of the reel-carrying unit of FIG. 4A.

In some embodiments, using the FBD 400 depicted in FIG. 4B, which represents the orientation of the reel-carrying unit in FIG. 4A, the orientation, forces, and moments can be determined. When the forces and angles are combined and set equal to mass times acceleration, when acceleration equals zero, the weight of the reel can be calculated. The weight of the reel 26 represented by the symbol $F_c$ can be determined from the equation below.

$$(-Ff(\sin(\theta)))(AF(\sin(\kappa)))+(Ff(\cos(\theta)))(AF(\cos(\kappa)))+\\(-Fb(\cos(\beta)))(AB(\sin(\alpha)))+(-Fb(\sin(\beta)))\,(AB\\(\cos(\alpha)))/((\sin(\theta)AC(\sin(\lambda))-(\cos(\theta))AC(\cos(\lambda)))\\=Fc$$

The above exemplary method for determining the weight of the reel may be accomplished by using pressure transducers to measure a rod pressure of the trunnion cylinder 28 and a bore pressure of the trunnion cylinder 28. The forces at particular locations may be combined with the distances to points (A, B, C, D, and F) and component center of gravity points to determine moments in the reel-carrying unit 14. Further, an angle of the chassis 16 may be measured using the chassis inclinometer 58, which may be a two-axis inclinometer, and an angle of the carriage 20 may be measured using any inclinometer or rotary encoder disposed on the carriage 20 as described above. Because the chassis inclinometer 58 is a two-axis inclinometer, the inclinometer of the carriage 20 may be a single axis inclinometer.

In some embodiments, the orientation sensors may be disposed at any area that may detect the angle of the trunnion cylinder 28, the angle of the lifting-arm support 32, the lifting arm 30, and any other portion of the carriage 20 that may provide a measurement of the angle of the carriage 20 relative to the angle of the chassis 16 and gravity. In some embodiments, any of the disclosed sensors may be disposed anywhere on the reel-carrying unit to detect orientation and loads due to the weight of the reel 26.

The FBD 400 may be used for any contracted or extended configuration of the carriage 20. As long as the forces and angles are measured, the weight of the reel 26 may be calculated by summing the forces determined by modeling the reel-carrying unit 14 using the FBD 400. In some embodiments, a friction factor may be added into the calculation when the load is measured dynamically. The friction factor may be indicative of forces that are applied due to the movement of the carriage 20. A nomenclature for the FBD 400 is provided below.

Points:
A=carriage pivot point
B=pinning point
C=reel center of mass point
D=trunnion cylinder pinning point
F=carriage center of mass point Lengths:
AB=length from A to B
AC=length from A to C
AD=length from A to D
AF=length from A to F
BD=length from B to D Angles:
μ=angle from line AC to line AB=constant
χ=angle from line AB to line AF=constant
σ=angle from deck to line AD=constant
α=angle from deck to line AB (This may be a direct measurement from the lifting-arm-support inclinometer 72.)
θ=angle from level plane to deck plane (This may be a direct measurement from the chassis inclinometer 58.)
β=angle from deck to line BD=90−σ/2−α/2 (this is true because length AD and length AB are equal)
λ=angle from deck to line AC=μ+α
κ=angle from deck to line AF=χ+α

Figure 5:
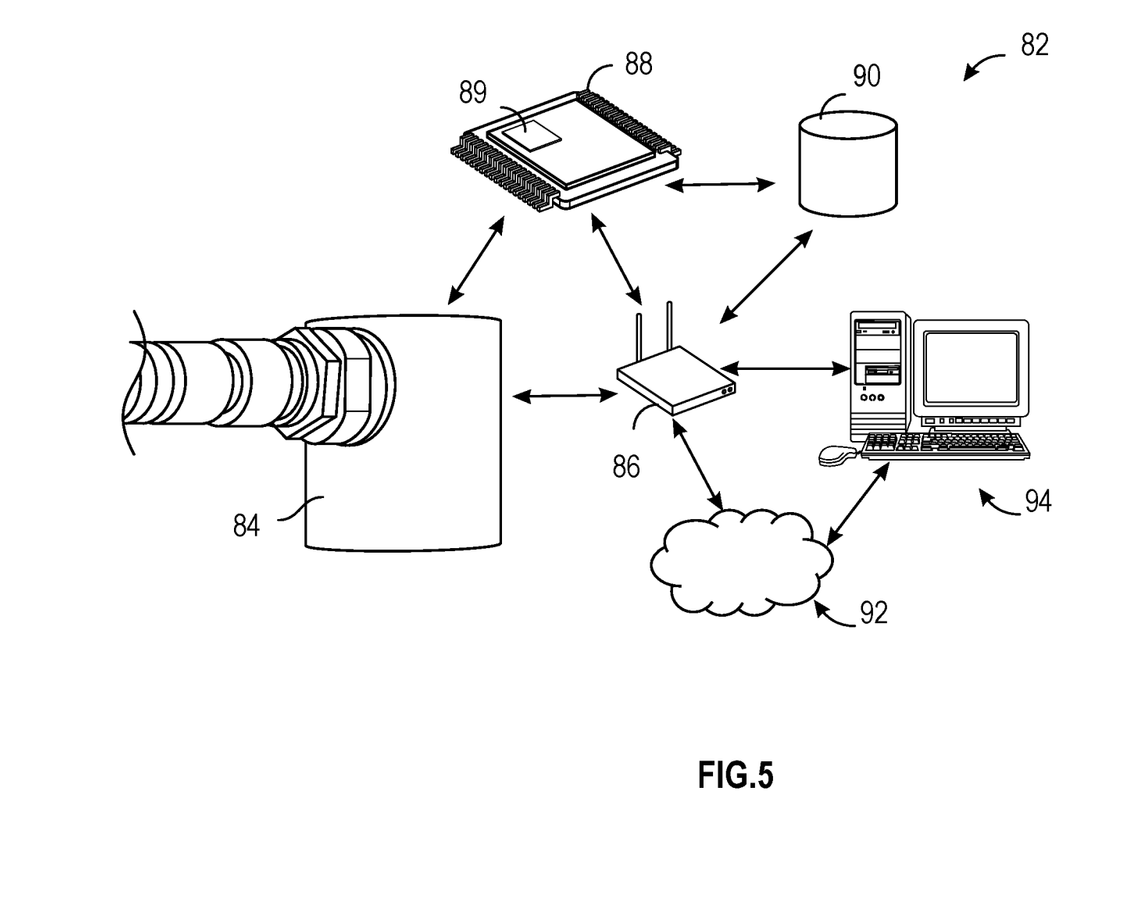
FIG. 5 depicts an exemplary hardware system for embodiments of the invention.

FIG. 5 depicts exemplary hardware system 82 for embodiments of the invention. A sensor 84 is connected to a transceiver 86 comprising a transmitter and receiver that may be any general transmitter and receiver associated with any hardware components described herein. The sensor 84 may be any position sensor or load sensor described in embodiments herein. At least one processor 88 may comprise a memory 89 and one or more non-transitory computer-readable media storing computer-executable instructions for performing methods described herein. A database 90 may store any data for performing methods described herein. In some embodiments, the hardware system 82 may connect to any local or online network 92 and other general computer 94 or processer connected thereto. The hardware system 82 may comprise displays and microphones or other input or output devices for notifying an operator of the equipment of the status of the reel-carrying unit 14 and the weight of the reel 26.

Figure 6:
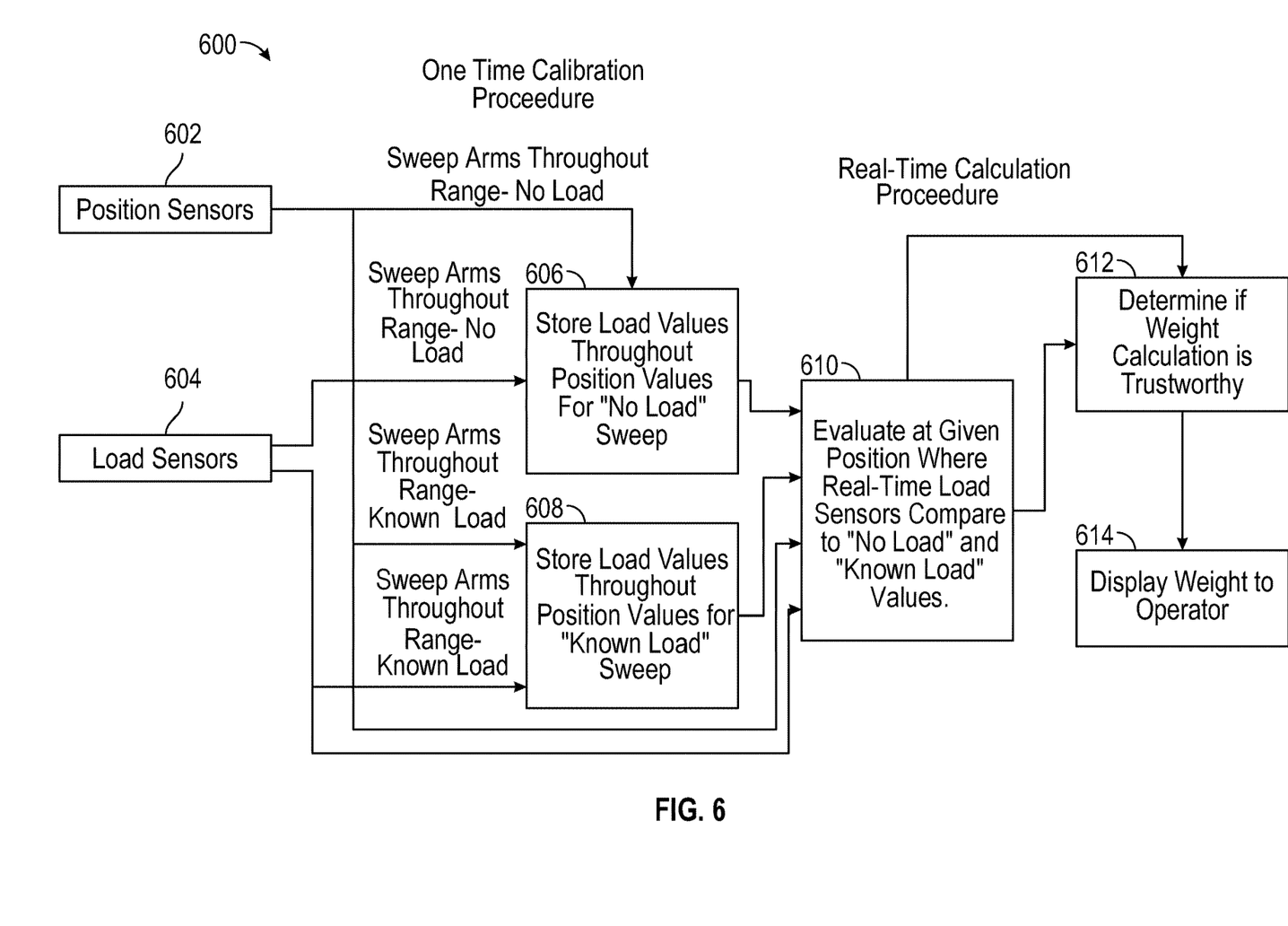
FIG. 6 depicts an exemplary flow diagram for embodiments of determining a weight of a reel using a calibration method.

Turning now to FIG. 6, in some embodiments, a geometric calibration method may be used to determine the weight of the reel 26 generally referenced by numeral 600. At step 602, the position sensors detect orientation of the carriage 20. The position sensors may include the linear position sensor 70, the main pin rotary encoder 56, the cylinder pin rotary encoder 60, inclinometers: the cylinder brace inclinometer 66, the lifting-arm-support inclinometer 72, the chassis inclinometer 58; and any other sensors that may be used to detect the orientation of the reel-carrying unit 14 as described above.

At step 604, strategically placed load sensors detect the loads in the reel-carrying unit 14. The load sensors may measure the forces in the reel-carrying unit 14 as described above. The forces at particular locations may be combined with the distances to pivot points and component center of gravity points to determine moments in the reel-carrying unit 14. The load sensors may include any load cells, strain gauges, pressure transducers, and any other sensors capable of measuring force as described in embodiments above.

Strategically placed position sensors detect the angles of components to determine the orientation of the carriage 20. The orientation of the carriage 20 may be combined with the load measurements to determine the load, or reel weight, as described above. The orientation sensor locations and load sensor locations are described in detail in reference to FIGS. 3 and 4A above.

At steps 606 and 608, a one-time calibration procedure is conducted. At step 606, the carriage 20, with no reel, may be swept from fully extended to fully retracted and vice versa. The load values determined from the load sensors may be stored along with position values determined from the position sensors. This provides a baseline curve of load values across the range of orientations of the carriage 20 from fully extended to fully retracted with no reel weight. Therefore, the forces in the load sensors are measured and stored for sample angles with no reel weight added. Sweeping from fully extended to fully retracted and vice versa allows a friction coefficient to be determined in both directions as it may not be the same in both directions. In some embodiments, the friction coefficient may change during the sweep and an average may be determined or a first order or higher friction model may be used.

At step 608, the carriage 20, with a maximum load reel 26 attached, is swept from fully extended to fully retracted and vice versa. The load values determined from the load sensors are stored along with position values determined from the position sensors. This provides a curve of load values across the range of orientations of the carriage 20 from fully extended to fully retracted and vice versa. In some embodiments, the weight of the max-load reel in the calibration process is near, or at, the limit load of the reel-carrying unit 14. The process of sweeping from fully extended to fully retracted with no load and with a full load provides calibration models on each end of the limits of the reel-carrying unit 14. Therefore, any load may be compared to the two curves provided by these two sweeps to estimate a load on the carriage 20 provided by the weight of the reel 26. Though described as the max-load reel calibration process, any known weight may be used for calibration and the curve may be extrapolated from the no-weight and the known-weight results. In some embodiments, the no-weight model may also be a known weight as long as the two known weights are different and allow an accurate extrapolation.

Figure 7:
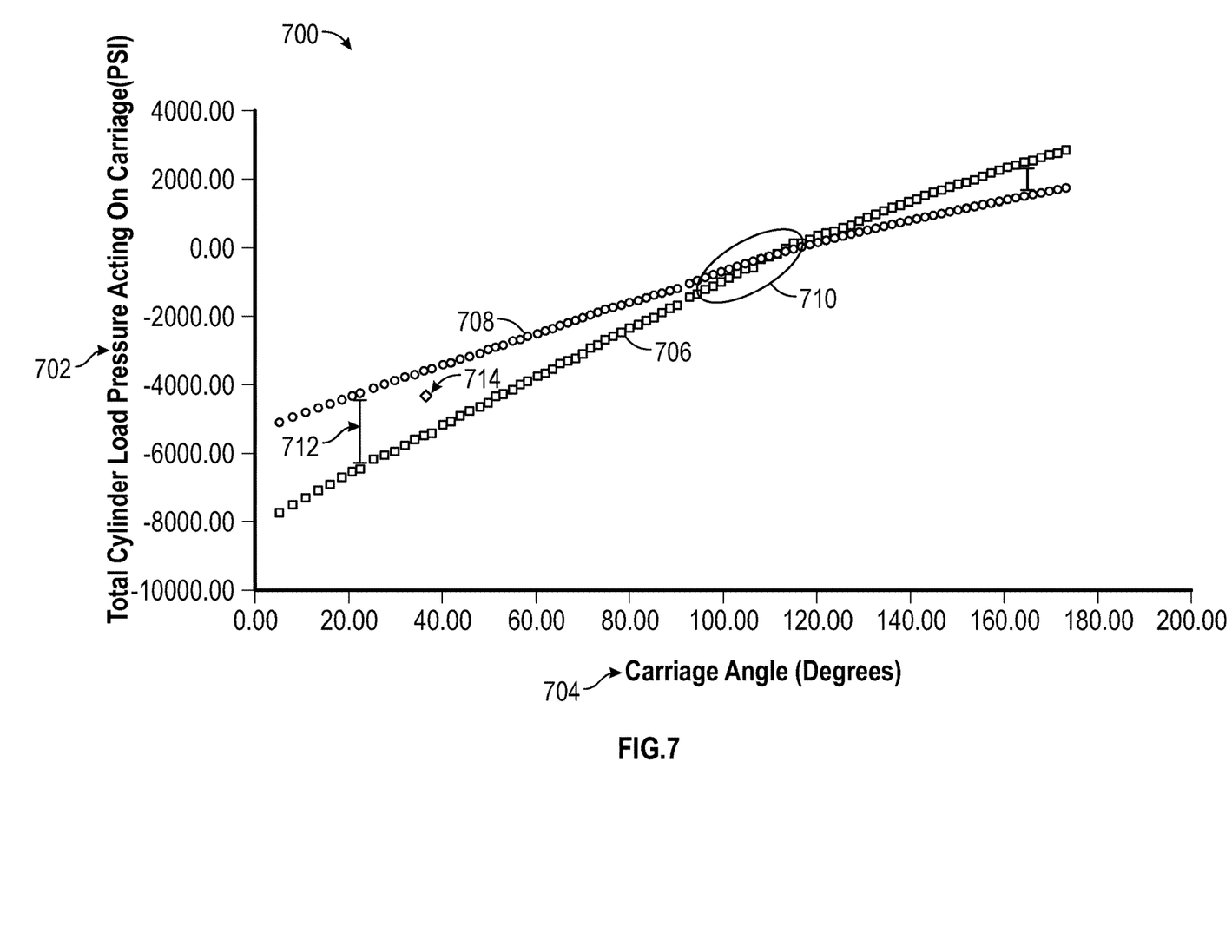
FIG. 7 depicts an exemplary relationship between cylinder load pressure and carriage angle for calibration in certain embodiments of the invention.

The exemplary calibration curve presented in FIG. 7 depicts the stored data from the calibration sweeps in the calibration graph 700. The vertical axis represents the total cylinder load pressure 702 acting on the carriage 20 in Pounds per Square Inch (PSI). The total cylinder load pressure 702 may be measured by the pressure transducers 68. The horizontal axis represents the carriage angle 704 in degrees. The max-reel calibration data 706 may represent the data associated with the max-reel calibration sweep. The no-reel calibration data 708 may represent the data associated with the sweep with no reel mounted on the carriage 20. Though the exemplary chart depicts pressure vs carriage angle, any combination of load sensors and orientation sensors may be used. For example, the total load pressure may be load measured in load pin 62 or any combination of load sensors and the carriage orientation may be measured by any one or combination of the orientation sensors described herein.

In some embodiments, it may not be possible to accurately measure the weight of the reel 26 in certain configurations. In certain carriage 20 orientations the load measurements may be zero or close to zero when the reel 26 is supported. For example, exemplary section 710 depicts a measurement of such a configuration. As described above, when the carriage 20, supporting the reel 26, weight is balanced, the trunnion cylinder 28 may do very little to no work to maintain the orientation. Therefore, though the reel is supported, the pressure transducers may detect a value of little to no force exerted and, consequently, provide a measurement of zero. Therefore, as the orientation of the carriage 20 converges on these points, the weight measurement results may not be trusted. Section 710 depicts the area that may not be trusted.

At step 610, the real-time evaluation of a reel 26 on the reel-carrying unit 14 is performed. Real-time data may be received from the position sensors and the load sensors by the at least one processor 88. The at least one processor 88 may execute computer-executable instructions performing a method of comparing the sensor information and the calibration information for determining the weight of the reel 26. Turning back to FIG. 7, the range 712 between the no-reel calibration data 708 and the max-reel calibration data 706 represents an area where the real-time measured total cylinder load pressure 702 should lie between the data sets for a particular angle of the carriage 20. If, at the particular angle of the carriage 20, the total cylinder load pressure 702 is outside of these data points, or an acceptable weight, there is either an error or the reel 26 is above maximum load. In this case, the reel 26 should not be carried. In the exemplary calibration graph 700, the total cylinder load pressure 702 is measured at an angle of the carriage 20 of about 35 degrees and the total cylinder load pressure is about −4,500. The total cylinder load pressure 702 at the orientation, or angle of the carriage 20, may be indicative of the weight of the carriage 20 and the reel 26. As the data point 714 (indicative of the weight of the reel 26 at the orientation of the carriage 20) falls within the range 712, the reel 26 is within operational range and can be carried. The total cylinder load pressure 702 may be compared to a table of reel weights associated with the total cylinder load pressure 702 values. In some embodiments, the weight of the reel 26 is extrapolated from the stored values. The total cylinder load pressure 702 may be the total pressure in the trunnion cylinder 28 as measured by the pressure transducers 68.

In some embodiments, a reverse load may be responsible for the high load measurements. For example, the reverse load may be caused by the operator pressing the carriage 20 into the chassis 16 when storing the reel 26 for transport. Further, the reel 26 may be pressed into the ground resulting in a spike in load measurement. These activities may result in high load measurements and may be harmful to the reel-carrying unit 14. An alert may be sent to the operator of the reel-carrying unit 14 when such an event occurs.

At step 612, the weight calculation may be evaluated for correctness. In some embodiments, the weight calculation may be compared to stored weight tables to determine if the weight calculations are within an acceptable range. Further, the weight of the reel 26 may be determined at various configurations. The determined weights from various configurations may be compared to determine if the weight calculations are consistent. For example, the weight may be determined to be approximately 5,000 pounds at a plurality of orientations. At one orientation the weight may be approximately 6,000 pounds. The weight may again be measured at the orientation resulting in 6,000 pounds or the measurement may be determined to be erroneous and disregarded. Further, it may be determined that the weight was measured within the region 710. The results in this region may not be trusted and, consequently, disregarded.

At step 614, when it is determined that the weight is correct, the weight may be displayed to an operator of the reel-carrying unit 14. The weight may be sent to a display of the reel-carrying unit 14 such that the operator may know the weight. The operator may then determine if the weight of the reel 26 and the weight of the reel-carrying unit 14 with the reel 26 meets the specifications of the reel-carrying unit 14 and the DOT regulations.

Figure 8:
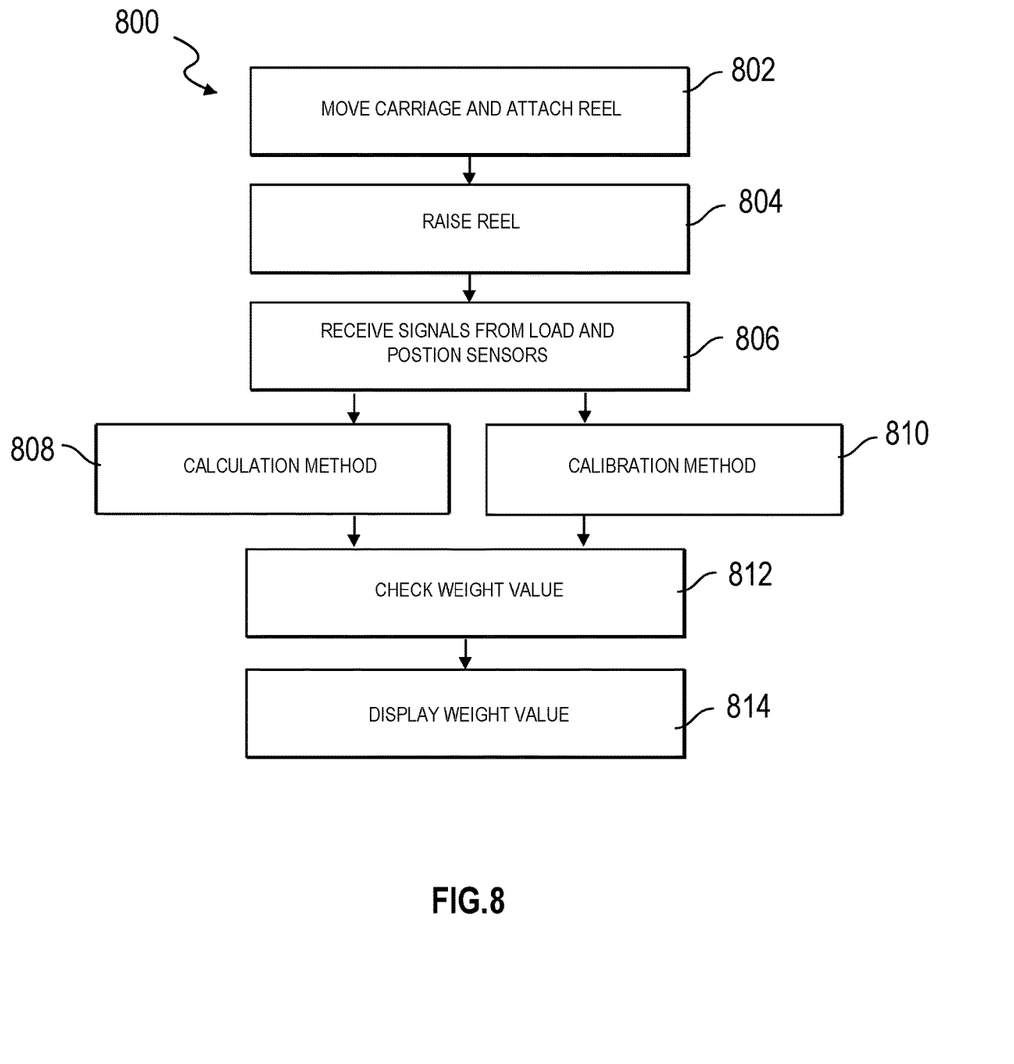
FIG. 8 depicts an exemplary flow chart determining reel weight in embodiments of the invention.

FIG. 8 depicts an exemplary method of general operation of the reel carrying unit 14 and weight measurement system. At step 802, the reel-carrying unit 14 is moved to a location to attach the reel 26. The trunnion cylinder 28 may be actuated to rotate the carriage 20 into position such that the reel attachment 34 is aligned with the reel 26. The right side 24 and the left side 22 may be moved laterally to attach the reel attachment 34 to the reel 26.

At step 804, once the reel 26 is attached to the carriage 20, the trunnion cylinder 28 may then be actuated to lift the reel 26. As the trunnion cylinder 28 is actuated, the carriage 20 and the attached reel 26 are rotated and the reel 26 is lifted.

At step 806, signals from the positions sensors and the load sensors are received. In some embodiments, the position sensors measure the orientation of the carriage 20 and may be the main pin rotary encoder 56, the chassis inclinometer 58, the cylinder pin rotary encoder 60, the cylinder brace inclinometer 66, the lifting-arm-support inclinometer 72, and the lifting-arm inclinometer 74. Any sensors capable of measuring the orientation of at least one component of the carriage 20 may be considered a position sensor. In some embodiments, the load sensors measure the loads in the system and may be the load pin 62, the axial load cell 64, the pressure transducers 68, and the lifting-arm load cell 76. Any sensor capable of measuring loads in the system may be considered a load sensor.

At step 808, in some embodiments, the weight of the reel 26 may be determined from the sensor measurements by utilizing the FBD 400 presented in FIG. 4B. The forces may be equated to mass times acceleration and, when acceleration is zero, the weight of the reel 26 can be determined as described above. The weight may also be dynamically determined when a friction factor is added to the calculation. The friction factor may be determined from experimentation measuring the changes in the forces while the carriage 20 is in motion.

At step 810, in some embodiments, the weight of the reel 26 may be determined by comparing the sensor measurements to stored calibration data. The stored calibration data may be trunnion cylinder 28 total pressures measured at various carriage 20 orientations with zero load and with maximum load (or any other load) applied to the carriage 20. The real-time sensor measurements may be compared to the calibration data depicted in FIG. 7 to determine the weight of the reel 26. In some embodiments, the orientation of the carriage 20 along with the total pressure in the trunnion cylinder 28 is used. The total pressure in the trunnion cylinder 28 may be determined from the pressure transducers 68 which, in some embodiments, may be a first pressure transducer measuring a rod pressure and a second pressure transducer measuring a bore pressure.

At step 812, when the weight of the reel 26 is determined, the weight may be evaluated for correctness. The weight may be compared to a range of values for realistic values, compared to various other calculated weights, and presented to the operator for an experience check. If the weight is determined to be valid and over-weight, the reel 26 may not be transported. If the weight of the reel 26 is determined to be within normal operating ranges, the reel 26 may be transported.

At step 814, the weight of the reel 26 may be displayed to the operator for verification and notification if the reel 26 is over-weight. Further, the weight of the reel 26 may be stored in the database 90 for future analysis.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for determining a weight of a reel when the reel is loaded, comprising:
    a reel-carrying unit, comprising:
        a chassis;
        a carriage supported by the chassis, the carriage comprising:
            a lifting arm configured to support the reel;
            a cylinder configured to rotate the lifting arm about a main pin;
    a reel weight measurement system, comprising:
        at least one first sensor disposed on the carriage and configured to measure at least one angle,
        wherein the at least one angle is indicative of an orientation of the carriage;
        at least one second sensor disposed on the carriage and configured to measure at least one force on the carriage,
        wherein the at least one force is indicative of the weight of the reel when loaded;
        one or more non-transitory computer-readable media storing computer-executable instructions that, when executed by at least one processor, perform a method of determining the weight of the reel, the method comprising the steps of:
            receiving at least one first signal indicative of the at least one angle from the at least one first sensor;
            receiving at least one second signal indicative of the at least one force from the at least one second sensor; and
            determining the weight of the reel when loaded based at least in part on the at least one first signal and the at least one second signal.

2. The system of claim 1, wherein the at least one first sensor and the at least one second sensor are configured to measure dynamically when the carriage is in motion.

3. The system of claim 2, wherein the determination of the reel weight is further based at least in part on a resistance factor indicative of a resistance in the reel-carrying unit when the carriage is in motion.

4. The system of claim 1, wherein the at least one first sensor is at least one of a rotary encoder, an inclinometer, and a linear position sensor.

5. The system of claim 1, wherein the at least one second sensor is at least one of a strain gauge, a load pin, a load cell, and a pressure transducer.

6. The system of claim 5, wherein the at least one second sensor comprises a first pressure transducer configured to measure a rod pressure of the cylinder and a second pressure transducer configured to measure a bore pressure of the cylinder.

7. The system of claim 6, wherein the computer-executable instructions are further executed to perform the steps of:
determining the weight of the reel based at least in part on the at least one first signal and the at least one second signal compared to stored data,
wherein the stored data comprises a plurality of load measurements at various carriage orientations when the carriage is supporting a known load and when the carriage is supporting no load.

8. The system of claim 1, wherein the reel-carrying unit is self-propelled and adapted to be controlled by a remote user.

9. One or more non-transitory computer-readable media storing computer-executable instructions that, when executed by at least one processor, perform a method of determining a weight of a reel when loaded onto a reel-carrying unit, the method comprising the steps of:
receiving at least one first signal from at least one first sensor,
wherein the at least one first signal is indicative of an orientation of a carriage of the reel-carrying unit;
receiving at least one second signal from at least one second sensor,
wherein the at least one second signal is indicative of a force applied to the carriage by the weight of the reel when loaded,
wherein the carriage is configured to support the reel when loaded; and
determining the weight of the reel based on the orientation of the carriage and the force applied by the weight of the reel.

10. The one or more non-transitory computer-readable media of claim 9, wherein the at least one first sensor is at least one of an inclinometer, a linear position sensor, and a rotary encoder.

11. The one or more non-transitory computer-readable media of claim 9, wherein the at least one second sensor is at least one of a strain gauge, a load cell, a load pin, and a pressure transducer.

12. The one or more non-transitory computer-readable media of claim 9,
wherein determining the weight of the reel is performed dynamically while the carriage is in motion, and
wherein determining the weight of the reel comprises determining a friction factor indicative of a plurality of friction forces caused by movement of the carriage.

13. The one or more non-transitory computer-readable media of claim 9,
wherein determining the weight of the reel is based on the orientation of the carriage and the force applied by the weight of the reel compared to stored data,
wherein the stored data is indicative of a relationship between carriage orientation, stored load sensor measurements, and reel weight.

14. The one or more non-transitory computer-readable media of claim 13, wherein the stored data is obtained by a first sweep of the carriage supporting a known load and a second sweep of the carriage with no load.

15. The one or more non-transitory computer-readable media of claim 14,
wherein the at least one first sensor is at least one of an inclinometer, a linear position sensor, and a rotary encoder, and
wherein the at least one second sensor is at least one of a strain gauge, a load cell, a load pin, and a pressure transducer.

16. A system for determining a weight of a reel when the reel is loaded, comprising:
a reel-carrying unit, comprising:
a chassis;
a carriage supported by the chassis, the carriage comprising:
a lifting arm supporting the reel;
a cylinder configured to rotate the lifting arm about a main pin;
a reel weight measurement system, comprising:
at least one first sensor disposed on the carriage and configured to measure at least one angle,
wherein the at least one angle is indicative of an orientation of the carriage;
at least one second sensor disposed on the carriage and configured to measure at least one force on the carriage,
wherein the at least one force is indicative of the weight of the reel when loaded;
one or more non-transitory computer-readable media storing computer-executable instructions that, when executed by at least one processor, perform a method of determining the weight of the reel, the method comprising the steps of:
receiving, from the at least one first sensor, at least one first signal indicative of the at least one angle of the carriage;
receiving, from the at least one second sensor, at least one second signal indicative of a load measurement on the carriage;
determining, from the at least one first sensor, the orientation of the carriage; and
determining the weight of the reel by comparing the orientation of the carriage and load measurement with stored data,
wherein the stored data is indicative of a relationship between the orientation of the carriage, the load measurement, and the weight of the reel.

17. The system of claim 16, wherein the stored data comprises a plurality of load measurement data determined from a first sweep of the carriage supporting a known load and a second sweep of the carriage supporting no load.

18. The system of claim 17, wherein the at least one first sensor is at least one inclinometer and is disposed on at least one of the chassis, a lifting-arm support, the lifting arm, a cylinder support, and the cylinder.

19. The system of claim 18, wherein the at least one second sensor is a first pressure transducer configured to measure a cylinder rod pressure and a second pressure transducer configured to measure a cylinder bore pressure.

20. The system of claim 19, further comprising the steps of:

detecting an angle of the chassis by the at least one inclinometer; and comparing the at least one angle of the carriage to the angle of the chassis to determine a relative angle between the carriage and the chassis.

\* \* \* \* \*